(12) United States Patent
Nagata

(10) Patent No.: US 9,430,081 B2
(45) Date of Patent: Aug. 30, 2016

(54) ELECTRONIC DEVICE, CONTROL METHOD, AND CONTROL PROGRAM

(75) Inventor: Yudai Nagata, Kawasaki (JP)

(73) Assignee: KYOCERA CORPORATION, Kyoto (JP)

(*) Notice: Subject to any disclaimer, the term of this patent is extended or adjusted under 35 U.S.C. 154(b) by 210 days.

(21) Appl. No.: 14/007,307

(22) PCT Filed: Mar. 23, 2012

(86) PCT No.: PCT/JP2012/057602
§ 371 (c)(1),
(2), (4) Date: Sep. 24, 2013

(87) PCT Pub. No.: WO2012/133226
PCT Pub. Date: Oct. 4, 2012

(65) Prior Publication Data
US 2014/0009424 A1 Jan. 9, 2014

(30) Foreign Application Priority Data
Mar. 25, 2011 (JP) .................... 2011-068967

(51) Int. Cl.
*G06F 3/041* (2006.01)
*G06F 3/042* (2006.01)
(Continued)

(52) U.S. Cl.
CPC ............ *G06F 3/0416* (2013.01); *G06F 3/042* (2013.01); *G06F 3/0418* (2013.01);
(Continued)

(58) Field of Classification Search
CPC .. G06F 3/0304; G06F 3/0416; G06F 3/0418; G06F 3/042; G06F 3/04815; G06F 3/04883; G06F 2203/04108; G06F 2203/04808; H04M 1/67; H04M 2250/12; H04M 2250/22

USPC ............... 345/156–178, 419, 424, 427, 589; 463/36; 715/856, 863
See application file for complete search history.

(56) References Cited

U.S. PATENT DOCUMENTS

| | | | | |
|---|---|---|---|---|
| 5,801,681 | A * | 9/1998 | Sayag | G06F 3/021 345/157 |
| 7,532,206 | B2 * | 5/2009 | Morrison | G06F 3/03545 178/18.01 |

(Continued)

FOREIGN PATENT DOCUMENTS

| JP | 2005-322071 A | 11/2005 |
|---|---|---|
| JP | 2008-40576 A | 2/2008 |

(Continued)

OTHER PUBLICATIONS

Partial Supplementary European Search Report dated Nov. 28, 2014, corresponding to European patent application No. 12764899.6.

(Continued)

*Primary Examiner* — Prabodh M Dharia
(74) *Attorney, Agent, or Firm* — Hauptman Ham, LLP

(57) ABSTRACT

An electronic device includes a display unit configured to stereoscopically display a predetermined object; an operation unit configured to execute an operation associated with the predetermined object; a detecting unit configured to detect a movement of a physical body in a three-dimensional space above the display unit where the predetermined object is displayed; and a control unit configured to a strength of an operation performed by a user on the predetermined object based on the detected movement, change a content of the operation associated with the predetermined object according to the determined strength, and based on a result of detecting a position of the physical body contacting the predetermined object, adjust a degree of stereoscopic vision with which the predetermined object is stereoscopically displayed.

15 Claims, 9 Drawing Sheets

(51) Int. Cl.
*G06F 3/0481* (2013.01)
*G06F 3/0488* (2013.01)
*H04M 1/67* (2006.01)

(52) U.S. Cl.
CPC ...... *G06F 3/04815* (2013.01); *G06F 3/04883* (2013.01); *G06F 2203/04108* (2013.01); *G06F 2203/04808* (2013.01); *H04M 1/67* (2013.01); *H04M 2250/12* (2013.01); *H04M 2250/22* (2013.01)

(56) References Cited

U.S. PATENT DOCUMENTS

| | | | |
|---|---|---|---|
| RE40,891 E * | 9/2009 | Yasutake | 345/173 |
| 7,626,569 B2 * | 12/2009 | Lanier | G06F 1/1601 345/156 |
| 7,728,848 B2 * | 6/2010 | Petrov | G06T 17/205 345/619 |
| 8,230,367 B2 | 7/2012 | Bell et al. | |
| 8,559,676 B2 | 10/2013 | Hildreth | |
| 2003/0112233 A1 * | 6/2003 | Miida et al. | 345/419 |
| 2003/0142068 A1 * | 7/2003 | DeLuca | G02B 27/22 345/156 |
| 2006/0119572 A1 * | 6/2006 | Lanier | G06F 1/1601 345/156 |
| 2006/0252541 A1 * | 11/2006 | Zalewski et al. | 463/36 |
| 2007/0211031 A1 * | 9/2007 | Marc | G06F 3/0304 345/163 |
| 2008/0005703 A1 * | 1/2008 | Radivojevic et al. | 715/863 |
| 2009/0077504 A1 * | 3/2009 | Bell et al. | 715/863 |
| 2010/0095249 A1 * | 4/2010 | Yoshikawa et al. | 715/856 |
| 2010/0214394 A1 * | 8/2010 | Maekawa | 348/51 |
| 2010/0248837 A1 * | 9/2010 | Suzuki et al. | 463/36 |
| 2010/0306716 A1 | 12/2010 | Perez | |
| 2011/0003639 A1 * | 1/2011 | Takehiro | 463/35 |
| 2011/0074772 A1 * | 3/2011 | Wada | G06T 19/20 345/419 |
| 2011/0157169 A1 * | 6/2011 | Bennett | G06F 3/14 345/419 |
| 2011/0187706 A1 * | 8/2011 | Vesely | G06T 15/00 345/419 |
| 2012/0044172 A1 * | 2/2012 | Ohki | G06F 3/04883 345/173 |
| 2012/0062564 A1 * | 3/2012 | Miyashita | G06F 1/1626 345/419 |
| 2012/0162214 A1 * | 6/2012 | Chavez | G06F 3/012 345/419 |
| 2012/0176370 A1 * | 7/2012 | Imai | H04N 13/0456 345/419 |
| 2012/0235892 A1 * | 9/2012 | Narendra et al. | 345/156 |
| 2012/0281018 A1 * | 11/2012 | Yamamoto | G06F 1/1626 345/634 |
| 2012/0287044 A1 | 11/2012 | Bell et al. | |
| 2012/0287065 A1 * | 11/2012 | Oshinome | 345/173 |
| 2013/0016246 A1 * | 1/2013 | Hatanaka | G06T 11/00 348/222.1 |
| 2013/0050202 A1 * | 2/2013 | Ueno | G06F 3/044 345/419 |
| 2013/0265220 A1 * | 10/2013 | Fleischmann | G06F 3/017 345/156 |
| 2014/0198077 A1 * | 7/2014 | Oba | G06F 3/0416 345/174 |
| 2015/0035781 A1 * | 2/2015 | Oshinome | 345/173 |

FOREIGN PATENT DOCUMENTS

| | | |
|---|---|---|
| JP | 2011-011008 A | 1/2011 |
| WO | 2008/083205 A2 | 7/2008 |
| WO | 2009/035705 A1 | 3/2009 |

OTHER PUBLICATIONS

Office Action mailed Feb. 10, 2015, corresponding to Japanese patent application No. 2011-068967, for which an explanation of relevance is attached.
Extended European Search Report issued Mar. 30, 2015, corresponding to European patent application No. 12764899.6.
International Search Report and Written Opinion corresponding to PCT/JP2012/057602, dated Jul. 24, 2012.

* cited by examiner

ELECTRONIC DEVICE, CONTROL METHOD, AND CONTROL PROGRAM

CROSS-REFERENCE TO RELATED APPLICATION

This application is a National Stage of PCT international application Ser. No. PCT/JP2012/057602 filed on Mar. 23, 2012 which designates the United States, and which is based upon and claims the benefit of priority from Japanese Patent Application No. 2011-068967 filed on Mar. 25, 2011.

FIELD

The present disclosure relates to an electronic device, a control method, and a control program.

BACKGROUND

In recent years, progress in a virtual reality technology and an augmented reality technology allows people to simulatively experience various events. For example, Patent Literature 1 discloses a technology capable of simulatively experiencing playing of a musical instrument.

CITATION LIST

Patent Literature

Patent Literature 1: JP-A-2011-011008

Technical Problem

However, an operation strength such as strength to strike a key is important to play a musical instrument. The technology described in Patent Literature 1 is used to implement simulation experience by touching a touch surface, and it is therefore difficult to sufficiently give a user a sense of actually playing a musical instrument.

For the foregoing reasons, there is a need for an electronic device, a control method, and a control program capable of detecting a user's operation in a stereoscopically displayed space.

SUMMARY

According to an aspect, an electronic device includes: a display unit for three-dimensionally displaying a predetermined object; an operation unit for executing an operation associated with the object; a detecting unit for detecting a displacement of a predetermined material body in three-dimensional space where the object is displayed; and a control unit for determining a strength of an operation performed on the object based on the detected displacement and changing a content of the operation according to the determined strength.

According to another aspect, a control method executed by an electronic device including a display unit, the control method comprising: three-dimensionally displaying a predetermined object; executing an operation associated with the object; detecting a displacement of a predetermined material body in three-dimensional space where the object is displayed; and determining a strength of an operation performed on the object based on the detected displacement and changing a content of the operation according to the determined strength.

According to another aspect, a control program for causing an electronic device including a display unit to execute: three-dimensionally displaying a predetermined object; executing an operation associated with the object; detecting a displacement of a predetermined material body in three-dimensional space where the object is displayed; and determining a strength of an operation performed on the object based on the detected displacement and changing a content of the operation according to the determined strength.

Advantageous Effects of Invention

According to one aspect of the present invention a user's operation in a stereoscopically displayed space can be detected.

DESCRIPTION OF EMBODIMENTS

The aspects of the present invention will be explained in detail below with reference to the drawings. It should be noted that the present invention is not limited by the following explanation. In addition, the components in the explanation below include those which are easily conceived by persons skilled in the art and those which are substantially identical thereto, and those in a scope of so-called equivalents. In the following, a mobile phone is used for explanation as an example of an electronic device; however, the application target of the present invention is not limited to the mobile phones. Therefore, the present invention is also applicable to, for example, PHSs (Personal Handyphone Systems), PDAs, portable navigation devices, notebook computers, and gaming devices.

Embodiments

Figure 1:
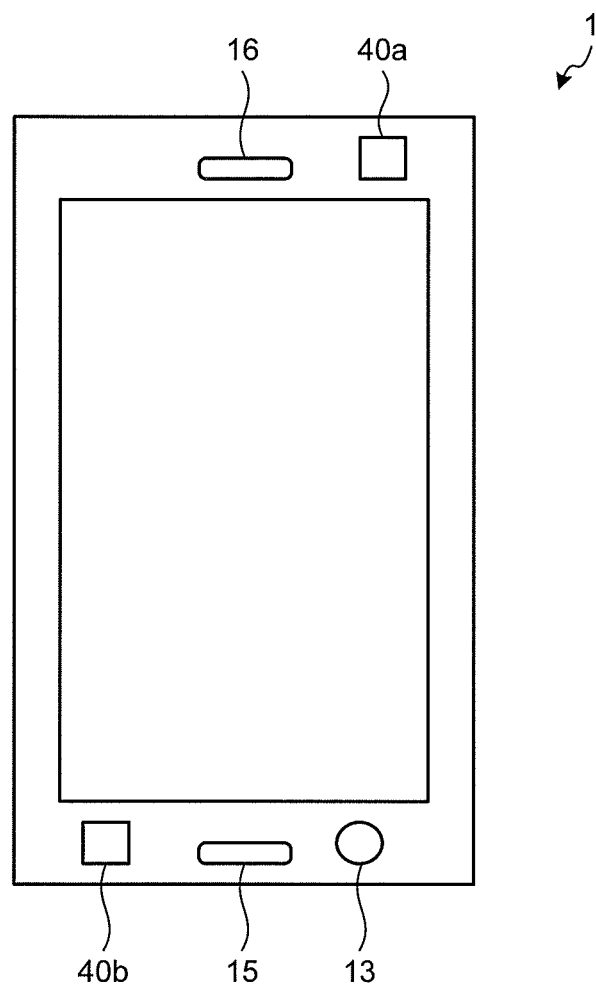
FIG. 1 is a front view illustrating an appearance of a mobile phone (electronic device) according to an embodiment.
Figure 2:
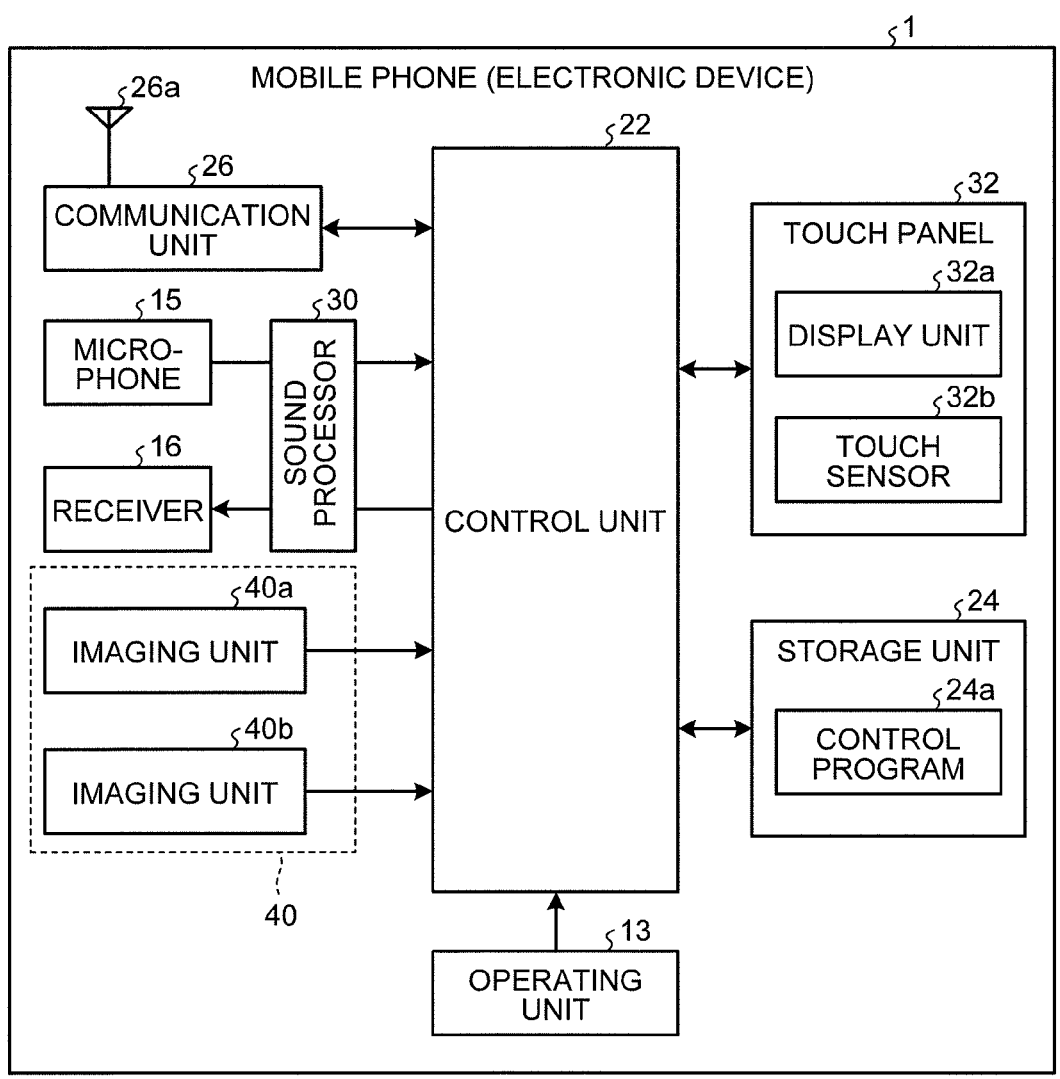
FIG. 2 is a block diagram illustrating a functional configuration of the mobile phone according to the embodiment.

First of all, a configuration of a mobile phone (electronic device) 1 according to the present embodiment will be explained below with reference to FIG. 1 and FIG. 2. FIG. 1 is a front view illustrating an appearance of the mobile phone 1. FIG. 2 is a block diagram illustrating a functional configuration of the mobile phone 1.

As illustrated in FIG. 1 and FIG. 2, the mobile phone 1 includes an operating unit 13, a microphone 15, a receiver 16, a control unit 22, a storage unit 24, a communication unit 26, a sound processor 30, a touch panel 32, and an imaging unit 40. The operating unit 13, the microphone 15, the receiver 16, the touch panel 32, and the imaging unit 40 are partially exposed to the front face of the mobile phone 1.

The operating unit 13 has a physical button, and outputs a signal corresponding to the pressed button to the control unit 22. In the example illustrated in FIG. 1, the operating unit 13 has only one button; however, the operating unit 13 may have a plurality of buttons.

The microphone 15 acquires an external sound. The receiver 16 outputs voice of the other party on the phone. The sound processor 30 converts a sound input from the microphone 15 to a digital signal and outputs the digital signal to the control unit 22. The sound processor 30 decodes the digital signal input from the control unit 22 and outputs the decoded signal to the receiver 16.

The communication unit 26 has an antenna 26a, and establishes a wireless signal path using a CDMA (Code Division Multiple Access) system or so with a base station via a channel allocated by the base station. The communication unit 26 performs telephone communication and information communication with other device through the wireless signal path established with the base station.

The touch panel 32 displays various types of information such as characters, graphics, and images, and detects an input operation performed on a predetermined area such as displayed icon, button, and character input area. The touch panel 32 includes a display unit 32a and a touch sensor 32b which are overlaid on each other.

The display unit 32a is provided with a display device such as an LCD (Liquid Crystal Display) or an OEL (Organic Electro-Luminescence) panel, and displays various types of information according to a control signal input from the control unit 22. The touch sensor 32b detects an input operation performed on the surface of the touch panel 32, and outputs a signal corresponding to the detected input operation to the control unit 22. In the present embodiment, the touch sensor 32b is a capacitive type sensor.

In the present embodiment, the touch panel 32 is capable of displaying a three-dimensional object. The three-dimensional object is an image and a shape created so as to be stereoscopically viewed using disparity. The method for displaying the three-dimensional object may be a method for realizing stereoscopic vision using a tool such as glasses or may be a method for realizing stereoscopic vision with the naked eyes.

The imaging unit 40 electronically acquires an image by using an imaging sensor. In the present embodiment, the imaging unit 40 includes an imaging unit 40a and an imaging unit 40b which are diagonally arranged on a plane where the touch panel 32 is provided; however, the imaging unit 40 does not necessarily require a plurality of imaging units. An angle of view and a layout of the imaging unit 40 are preferably configured so that a finger can be captured no matter where the finger is placed on the touch panel 32. The imaging unit 40 may be a device for acquiring an image of visible light or may be a device for acquiring an image of invisible light such as infrared rays.

The control unit 22 includes a CPU (Central Processing Unit) being a processing unit and a memory being a storage unit, and implements various functions by executing programs using these hardware resources. Specifically, the control unit 22 reads a program or data stored in the storage unit 24 to load it to the memory, and causes the CPU to execute instructions included in the program loaded to the memory. The control unit 22 performs read/write of data from/to the memory and the storage unit 24 and controls operations of the communication unit 26, the display unit 32a, and the like according to the execution result of the instructions executed by the CPU. When the CPU executes instructions, the data loaded to the memory and/or the signal input from the touch sensor 32b or so are used as part of parameters and determination conditions.

The storage unit 24 is formed from a nonvolatile storage device such as a flash memory, and stores therein various programs and data. The programs stored in the storage unit 24 include a control program 24a. The storage unit 24 may be constituted by combining a portable storage medium such as a memory card with a reader/writer for reading/writing data from/to the storage medium. In this case, the control program 24a may be stored in the storage medium. In addition, the control program 24a may be acquired from any other device such as a server through wireless communication performed by the communication unit 26.

The control program 24a provides functions related to various controls for operating the mobile phone 1. The functions provided by the control program 24a include a function for controlling the display of a three-dimensional object on the touch panel 32 and a function for detecting the strength of a user's operation performed on the three-dimensional object displayed by the touch panel 32.

Figure 3:
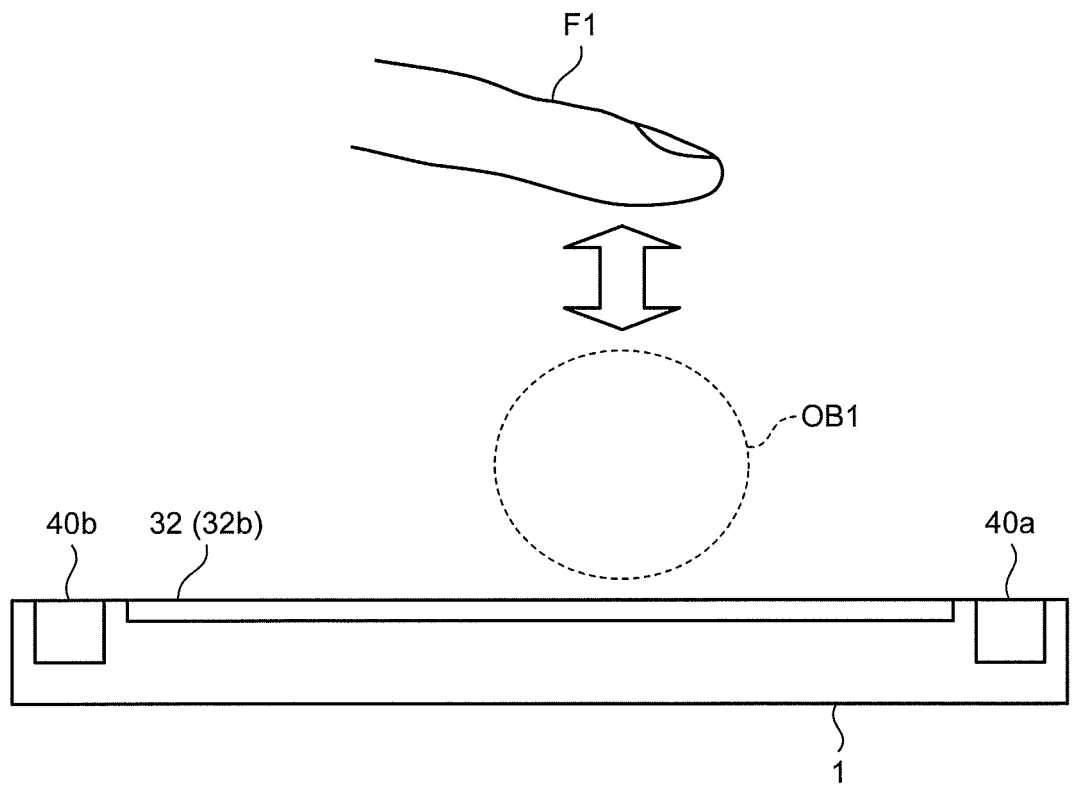
FIG. 3 is a diagram for explaining how to detect an operation performed on a three-dimensional object.
Figure 4:
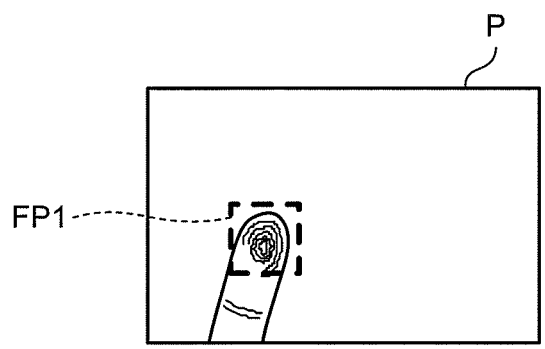
FIG. 4 is diagrams illustrating an example of images captured during the operation performed on the three-dimensional object.
Figure 4:
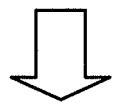
Figure 4:
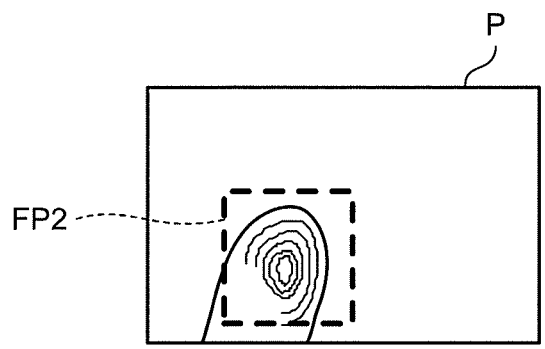
Figure 4:
Figure 4:
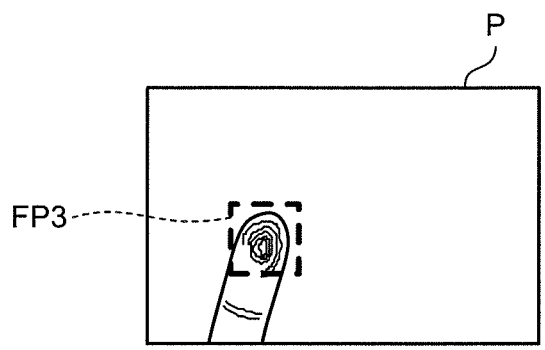
Figure 5:
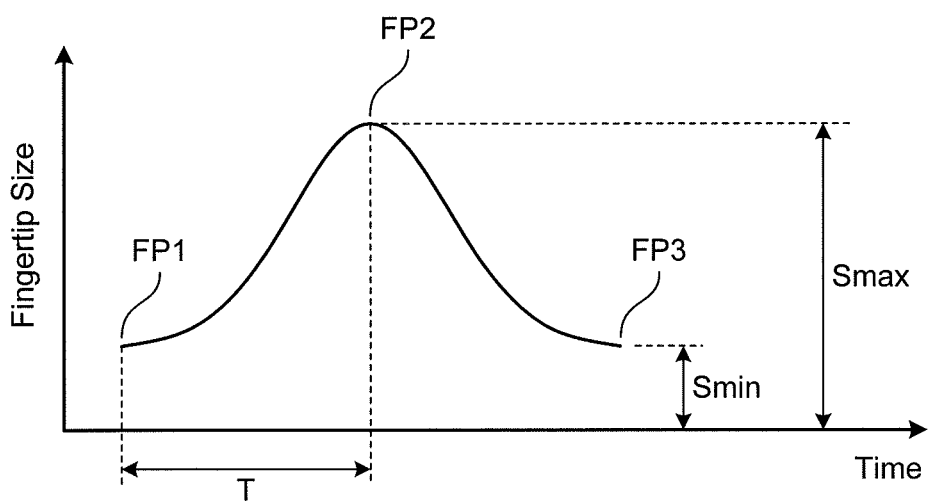
FIG. 5 is a diagram for explaining how to detect an operation strength on the three-dimensional object.

Then detection of an operation strength on a three-dimensional object will be explained below with reference to FIG. 3 to FIG. 5. FIG. 3 is a diagram for explaining how to detect an operation performed on a three-dimensional object. FIG. 4 is diagrams illustrating an example of images captured during the operation performed on the three-dimensional object. FIG. 5 is a diagram for explaining how to detect an operation strength on the three-dimensional object.

Suppose that the touch panel 32 displays a three-dimensional object OB1, as illustrated in FIG. 3. The three-dimensional object OB1 looks to the user as if it is floating in three-dimensional space above the touch panel 32, and therefore an operation on the three-dimensional object OB1 is performed at a position away from the touch panel 32. In FIG. 3, the user performs an operation of swinging a finger F1 down to the three-dimensional object OB1 and then bringing it back to its original position. The three-dimensional space means a real space which looks to the user as if the object OB1 exists therein.

Images P as illustrated in FIG. 4 is captured by the imaging unit 40 during the operation above. In FIG. 4, it is captured how a fingertip first appearing small in size becomes large with the swinging-down operation and returns to its original size with the operation of bringing the fingertip back to the original position. In FIG. 4, FP1 represents a fingertip area before start of the operation, FP2 represents a fingertip area when the finger F1 approaches the touch panel 32 most closely, and FP3 represents a fingertip area after completion of the operation.

By plotting sizes of the fingertip included in the images P captured during the operation in order of time, the curve as illustrated in FIG. 5 is obtained. When the three-dimensional object OB1 is operated by the finger F1, it is considered that the more strongly the finger F1 is moved, the shorter the time required for the operation becomes. Therefore, the strength of the operation can be determined based on time T from capturing an image of the finger F1 upon the start of the operation to capturing an image in which the fingertip most largely appears. In other words, it is possible to determine that the shorter the time T is, the more strongly the operation is performed and that the longer the time T is, the more weakly the operation is performed.

When the three-dimensional object OB1 is operated by the finger F1, it is considered that the more strongly the finger F1 is moved, the larger the movement amount of the finger F1 becomes. Therefore, the strength of the operation can also be determined based on a ratio between a size Smin of the fingertip area FP1 upon the start of the operation and a size Smax of the fingertip area FP2 when the finger F1 approaches the touch panel 32 most closely. In other words, it is possible to determine that the larger Smax/Smin is, the more strongly the operation is performed and that the smaller Smax/Smin is, the more weakly the operation is performed.

However, there is a case, depending on individuals, in which when the operation is comparatively weakly performed, the time T can clearly indicate the strength of the operation, while when the operation is comparatively strongly performed, Smax/Smin can clearly indicate the strength of the operation, and therefore, both of the indices are preferably used to determine the strength of the operation. In addition, to calculate these indices, it is necessary to recognize a start time of the operation. For example, the timing at which the size of the fingertip area included in the images captured by the imaging unit 40 is continuously increased a predetermined number of times or more may be treated as the start time of the operation.

To precisely recognize the size of the fingertip area, user's fingerprint data may be previously registered in the mobile phone 1, so that an area matching the registered fingerprint data may be treated as the fingertip area.

Figure 6:
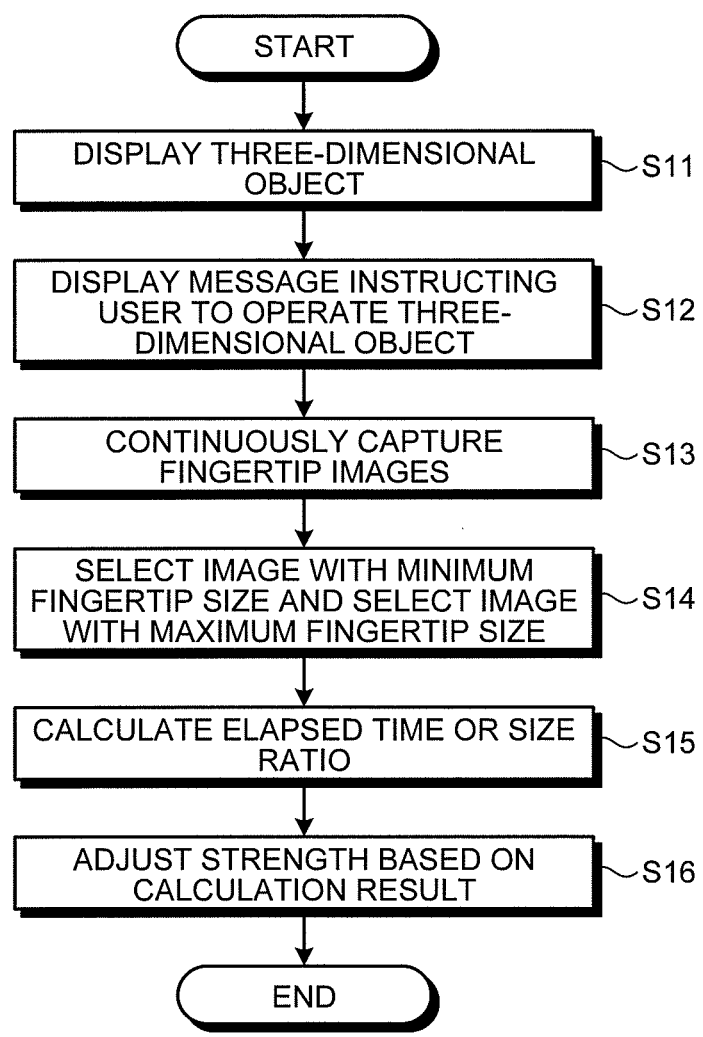
FIG. 6 is a flowchart illustrating a processing procedure of an adjustment process for an operation strength.

Next, a processing procedure of an adjustment process for an operation strength will be explained below with reference to FIG. 6. FIG. 6 is a flowchart illustrating a processing procedure of an adjustment process for an operation strength. The processing procedure illustrated in FIG. 6 is implemented by the control unit 22 executing the control program 24a. The processing procedure illustrated in FIG. 6 is executed at a timing before the user first performs an operation on the three-dimensional object, at a subsequent periodic timing, or the like.

As illustrated in FIG. 6, at first, at Step S11, the control unit 22 displays a three-dimensional object on the touch panel 32. Subsequently, at Step S12, the control unit 22 displays a message instructing the user to perform an operation on the three-dimensional object on the touch panel 32. Then at Step S13, the control unit 22 causes the imaging unit 40 to continuously capture fingertip images.

A period of time during which the imaging unit 40 is caused to continuously capture fingertip images may be a period of time being a preset length or may be a period of time until completion of the operation is detected from the captured images.

At Step S14, the control unit 22 selects an image with a minimum fingertip size and an image with a maximum fingertip size from among the captured images. Subsequently, at Step S15, the control unit 22 calculates at least one of an elapsed time between the selected images and a ratio between the sizes of the fingertip. Then at Step S16, the control unit 22 adjusts the strength of the operation by correcting a threshold for determining the strength of the operation based on the result of calculation or the like. The control unit 22 may calculate a value indicating the strength of the operation based on the elapsed time between the selected images or the ratio between the sizes of the fingertip and adjust a threshold according to a difference or a ratio between the strength previously associated with the threshold and the calculated strength.

Figure 7:
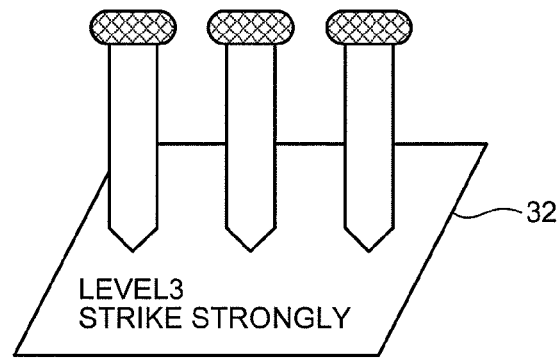
FIG. 7 is diagrams illustrating an example of performing the adjustment process by dividing the strength into levels.
Figure 7:
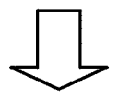
Figure 7:
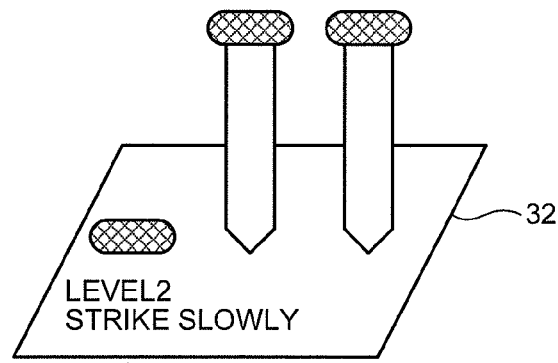
Figure 7:
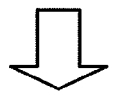
Figure 7:
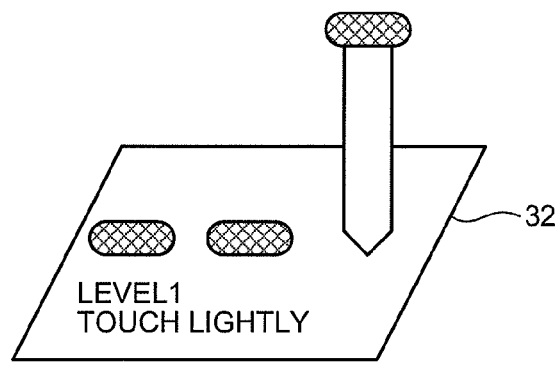

In this way, by executing the adjustment process for the operation strength, it is possible to adjust the determination of the operation strength to user's characteristics. As illustrated in FIG. 7, the strength may be classified into levels to perform the adjustment process. In the example of FIG. 7, three pins are displayed as three-dimensional objects, and the strengths of operations are adjusted based on results of strongly striking the pin on the left side, striking the pin at the center at a medium strength, and weakly striking the pin on the right side. By classifying the strength into the levels to perform the adjustment process, the adjustment process for the strengths of the operations can be more precisely performed.

As explained above, the present embodiment is configured to detect the strength of an operation performed by the user based on the time required for the operation or the movement distance with the operation, and therefore the strength of the user's operation can be detected accurately.

The aspect of the present invention represented in the embodiment can be arbitrarily modified within a scope that does not depart from the gist of the present invention. For example, the control program 24a described in the embodiment may be divided into a plurality of modules or may be integrated with the other programs. In the embodiment, a three-dimensional object is operated by a finger; however, a tool may be used to operate a three-dimensional object.

The present embodiment is configured to detect a move of the finger in a three-dimensional space based on the images captured by the imaging unit 40; however, the touch sensor 32b may be used to detect the move of the finger in the three-dimensional space. By adjusting the sensitivity of the touch sensor 32b, the moves of the finger in an X-axis direction, a Y-axis direction, and a Z-axis direction can be detected even if the finger is not in contact with the touch sensor 32b.

To improve the precision of determination of the operation strength, the degree of stereoscopic vision assumed by the mobile phone 1 and the degree of stereoscopic vision actually viewed by the user may be adjusted. How to adjust the degree of stereoscopic vision will be explained below with reference to FIG. 8 and FIG. 9.

Figure 8:
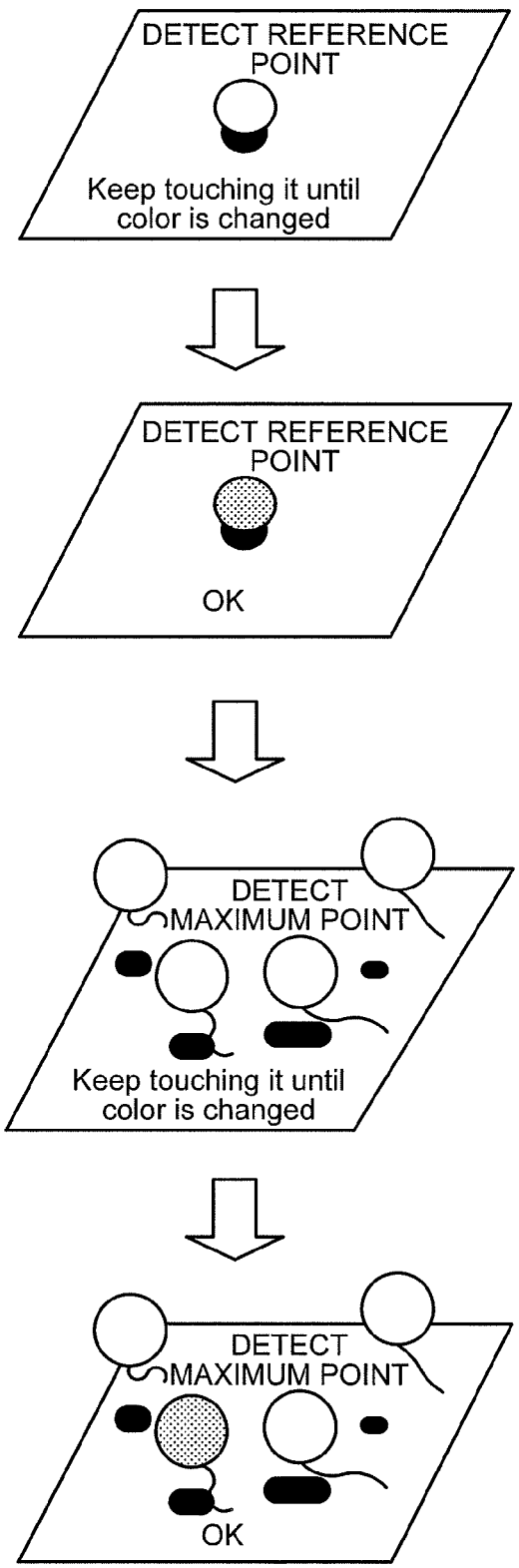
FIG. 8 is diagrams illustrating an example of adjusting a degree of stereoscopic vision.

As illustrated in FIG. 8, the control unit 22 displays one spherical three-dimensional object on the touch panel 32, and prompts the user to bring a finger into contact with the three-dimensional object. The user then places the finger at a position where the three-dimensional object is viewed. By detecting the position of the finger at this time, the degree of stereoscopic vision assumed by the mobile phone 1 and the degree of stereoscopic vision actually viewed by the user can be matched with each other.

Subsequently, the control unit 22 displays a plurality of three-dimensional objects with different degrees of stereoscopic vision on the touch panel 32, and prompts the user to bring a finger into contact with a three-dimensional object that is most stereoscopically viewed. The user then brings the finger into contact with the three-dimensional object that is most stereoscopically viewed. Based on determination on which of the three-dimensional objects is touched by the finger, the degree of most appropriate stereoscopic vision can be found.

Figure 9:
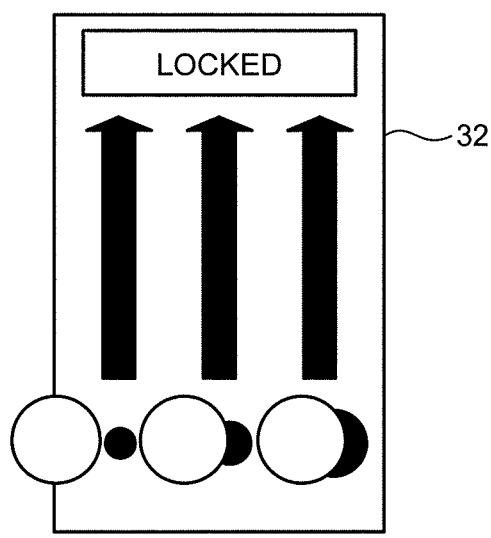
FIG. 9 is a diagram illustrating an example of adjusting the degree of stereoscopic vision on an unlock screen.

The degree of appropriate stereoscopic vision changes depending on physical conditions of the user, and it is therefore preferred to determine the degree as frequently as possible. For example, as illustrated in FIG. 9, a plurality of three-dimensional objects with different degrees of stereoscopic vision are displayed on an unlock screen displayed when the device returns from a power-saving state, and the return is executed in response to an operation corresponding to a three-dimensional object that is most stereoscopically viewed, so that the degree of appropriate stereoscopic vision can be frequently determined without placing any burden on the user.

In the above explanation, the strength of an operation is determined based on a time required for a change in the size of the predetermined material body; however, the embodiment is not limited thereto. For example, the strength of an operation may be determined based on a distance in which the predetermined material body moves in a space where a stereoscopic image is displayed. The operation strength should be set so as to be higher as the movement distance is larger. In this case, the movement of the finger has only to be captured by the imaging unit. In this case, by placing the imaging unit so that a movement direction of the finger is substantially parallel to an imaging face where the imaging unit can capture, a movement amount of the material body can be easily measured.

Alternatively, the strength of the operation may be determined based on a time required for movement of the predetermined material body from a predetermined first position to a predetermined second position. The operation strength should be set so as to be higher as the time required for the movement is shorter. In this case, the movement of the finger has only to be captured by the imaging unit. It may be configured that the user can set the predetermined first position and the predetermined second position while viewing the stereoscopic display. It goes without saying that, instead of the time required for the movement from the predetermined first position to the predetermined second position, a time from starting movement of the predetermined material body to stopping the movement may be set.

Alternatively, the operation strength may be set so as to be higher as a speed converted from the time required for the movement from the predetermined first position to the predetermined second position is higher. In this case, a linear distance from the first position to the second position is previously measured or set, and a speed required for the movement from the first position to the second position may be calculated from the distance and the time required for the movement.

The embodiment has represented the example of using the imaging unit to detect a displacement of each physical quantity occurring due to a movement of the predetermined material body; however, the embodiment is not limited thereto. For example, instead of the imaging unit, a sensor using a TOF (Time-of-Flight) method may be used. Alternatively, when an infrared sensor, a proximity sensor, or the like capable of detecting a movement in a planar direction of the stereoscopically displayed space is arranged substantially parallel with the movement direction of the predetermined material body, a displacement of the predetermined material body also can be detected in a noncontact manner, and therefore these devices may also be used. It is preferable that the displacement can be detected without providing the sensor or so in the predetermined material body. In this case, there is no need to attach an acceleration sensor to the finger or there is no need to move an electronic device itself with an acceleration sensor, which leads to cost reduction.

As an example of changing an operation content according to the level of determined strength, any example may be applicable if it is associated with the strength obtained when the finger or the like is moved in the space, and if it can adjust the level of the strength. For example, it may be configured to have some kinds of change in the object itself, such as movement of the object, change in the speed of the movement at that time, deformation of the object, or change in the amount of the object to be deformed, according to the level of the strength.

Alternatively, a key of a piano is displayed as an object, and therefore an operation content may be changed so that the sound of the piano is made larger as the level is higher. In this case, although it does not mean that the display of the object itself is changed, the level of the sound being a physical quantity associated with the object can be changed or the way to make a sound can be changed. In addition to that, the intensity of light, flickering thereof, its tempo, its cycle, or the like may be changed as physical quantities other than the sound.

The embodiment has described the case where the three-dimensional object projects toward the user side; however, the present invention is also applicable to a case of showing the three-dimensional object as if it is present in a deeper side than the display unit. In this case, the sensor and the camera may be provided in the back side of the display unit.

If the electronic device is a mobile phone, many mobile phones are provided with an in-camera for capturing the user himself/herself and an out-camera for capturing landscapes and the like. Therefore, it may be configured to capture a displacement of the predetermined material body in the back side by using the out-camera.

The invention claimed is:

1. An electronic device, comprising:
a touch panel including a display unit configured to stereoscopically display a predetermined object;
an operation unit configured to execute an operation associated with the predetermined object;
a detecting unit configured to detect a movement of a user's physical body part in a three-dimensional space above the display unit;
an imaging unit configured to capture images of the user's physical body part during the movement, said captured images including a smallest image of the user's physical body part at a start of the movement and a largest image of the user's physical body part when the user's physical body part is closest to the touch panel; and
a control unit configured to
determine a strength of an operation performed by the user's physical body part on the predetermined object based on a ratio between the largest image of the user's physical body part and the smallest image of the user's physical body part,
change a content of the operation associated with the predetermined object according to the determined strength, and
based on a result of detecting a position of the user's physical body part contacting the predetermined object, adjust a degree of stereoscopic vision with which the predetermined object is stereoscopically displayed.

2. The electronic device according to claim 1, wherein the detecting unit is configured to detect the movement without contacting the user's physical body part.

3. The electronic device according to claim 1, wherein the control unit is configured to determine the strength of the operation further based on a distance in which the user's physical body part moves in the three-dimensional space.

4. The electronic device according to claim 1, wherein the control unit is configured to determine the strength of the operation further based on a time required for the movement of the user's physical body part from a first position to a second position.

5. The electronic device according to claim 1, wherein the control unit is configured to determine the strength of the operation further based on a speed converted from a time required for the movement of the user's physical body part from a first position to a second position.

6. The electronic device according to claim 1,
wherein the control unit is configured to determine the strength of the operation further based on a time required for a change between a size of the user's physical body part in the smallest image and the size of the user's physical body part in the largest image.

7. The electronic device according to claim 6, wherein the user's physical body part is a finger, and the size is of an area of a fingertip of the finger.

8. The electronic device according to claim 7,
wherein
the control unit is configured to
determine the strength of the operation further based on an elapsed time between a time at which the smallest image of the user's physical body part is captured and a time at which the largest image of the user's physical body part is captured.

9. The electronic device according to claim 1, wherein the user's physical body part is a finger.

10. The electronic device according to claim 9, wherein
the movement of the user's physical body part is detected based on the images captured by the imaging unit, and
the control unit is configured to check previously stored fingerprint data against the images to thereby calculate the size of the user's physical body part.

11. The electronic device according to claim 1, wherein the control unit is configured to adjust a threshold for determining the strength of the operation based on a difference or a ratio between a specified strength and the strength of the operation determined based on the movement of the user's physical body part.

12. The electronic device according to claim 1, wherein the control unit is configured to cause the display unit to
stereoscopically display an adjusting object with a predetermined degree of stereoscopic vision,
upon a contact of the user's physical body part with said adjusting object, change an appearance of said adjusting object, and
after the contact, adjust the degree of stereoscopic vision, with which the adjusting object is stereoscopically displayed, based on a position where the contact is detected.

13. The electronic device according to claim 1, wherein the control unit is configured to cause the display unit to
stereoscopically display a plurality of adjusting objects with different degrees of stereoscopic vision, and
after the user's physical body part is in contact with one of the plurality of adjusting objects, adjust the degree of stereoscopic vision, with which the one adjusting object is stereoscopically displayed, in accordance with the degree of stereoscopic vision of said one adjusting object.

14. A control method executed by an electronic device including a touch panel that includes a display unit, the control method comprising:
stereoscopically displaying a predetermined object;
executing an operation associated with the predetermined object;
detecting a movement of a user's physical body part in a three-dimensional space above the display unit;
capturing images of the user's physical body part during the movement, said captured images including a smallest image of the user's physical body part at a start of the movement and a largest image of the user's physical body part when the user's physical body part is closest to the touch panel;
determining a strength of an operation performed by the user's physical body part on the predetermined object based on a ratio between the largest image of the user's physical body part and the smallest image of the user's physical body part;
changing a content of the operation associated with the predetermined object according to the determined strength; and
based on a result of detecting a position of the user's physical body part contacting the predetermined object, adjust a degree of stereoscopic vision with which the predetermined object is stereoscopically displayed.

15. A non-transitory storage medium that stores a control program for causing, when executed by an electronic device including a touch panel that includes a display unit, the electronic device to execute:
stereoscopically displaying a predetermined object;
executing an operation associated with the predetermined object;
detecting a movement of a user's physical body part in a three-dimensional space above the display unit;
capturing images of the user's physical body part during the movement, said captured images including a smallest image of the user's physical body part at a start of the movement and a largest image of the user's physical body part when the user's physical body part is closest to the touch panel;
determining a strength of an operation performed by the user's physical body part on the predetermined object based on a ratio between the largest image of the user's physical body part and the smallest image of the user's physical body part;
changing a content of the operation associated with the predetermined object according to the determined strength; and
based on a result of detecting a position of the user's physical body part contacting the predetermined object, adjust a degree of stereoscopic vision with which the predetermined object is stereoscopically displayed.

* * * * *